United States Patent [19]
Barreiro, Jr.

[11] Patent Number: 5,634,668
[45] Date of Patent: Jun. 3, 1997

[54] INFORMATION INDEXING METHOD AND APPARATUS

[76] Inventor: Armando Barreiro, Jr., 8025 SW. 4th St., Miami, Fla. 33144

[21] Appl. No.: 344,226

[22] Filed: Nov. 23, 1994

[51] Int. Cl.$^6$ ............................. G09B 1/12; B42D 15/00
[52] U.S. Cl. ........................ 281/33; 402/79; 40/124.2
[58] Field of Search ..................... 40/124, 124.2, 40/159; 402/79; 281/33

[56] References Cited

U.S. PATENT DOCUMENTS

| | | | |
|---|---|---|---|
| D. 294,908 | 3/1988 | Childress | D6/570 |
| D. 324,883 | 3/1992 | Demirjian | D19/90 |
| 2,283,584 | 5/1942 | Sloan | 281/33 X |
| 3,001,800 | 9/1961 | Pearce | 281/33 |
| 3,366,359 | 1/1968 | Wolf et al. | 281/33 X |
| 4,391,375 | 7/1983 | Joyce . | |
| 4,974,983 | 12/1990 | Givati | 402/80 R |
| 5,046,273 | 9/1991 | Virvo | 40/571 |
| 5,215,398 | 6/1993 | White et al. | 402/73 |
| 5,393,157 | 2/1995 | Basmajian | 402/79 |

FOREIGN PATENT DOCUMENTS

| | | | |
|---|---|---|---|
| 796570 | 4/1936 | France | 281/33 |
| 228952 | 9/1943 | Switzerland | 281/33 |
| 603345 | 6/1948 | United Kingdom | 116/323 |

*Primary Examiner*—Frances Han
*Attorney, Agent, or Firm*—Frank L. Kubler

[57] ABSTRACT

An apparatus for delivering categorized information includes a information storage device designed to retain detailed information divided into categories, including a mechanism for accessing the information by category, and a information indexing assembly including a display structure having several display members and having holding structures for the display members connected to the display structure so that the display members are simultaneously displayed. Each display member has a display face with one of the information categories marked on the display face. At least one of the display members functions to direct an observer to one given information category within the information storage device and functions to remain in the possession of an observer as a reminder of the given information category and of the information retrieved about the given information category. The display member is preferably a business card. The display structure preferably includes an upright panel member having a forward panel member face and the holding structures include several display member retaining pockets formed of transparent material, the pockets being secured to the panel member forward face. The information storage device may be a book or a computer.

8 Claims, 5 Drawing Sheets

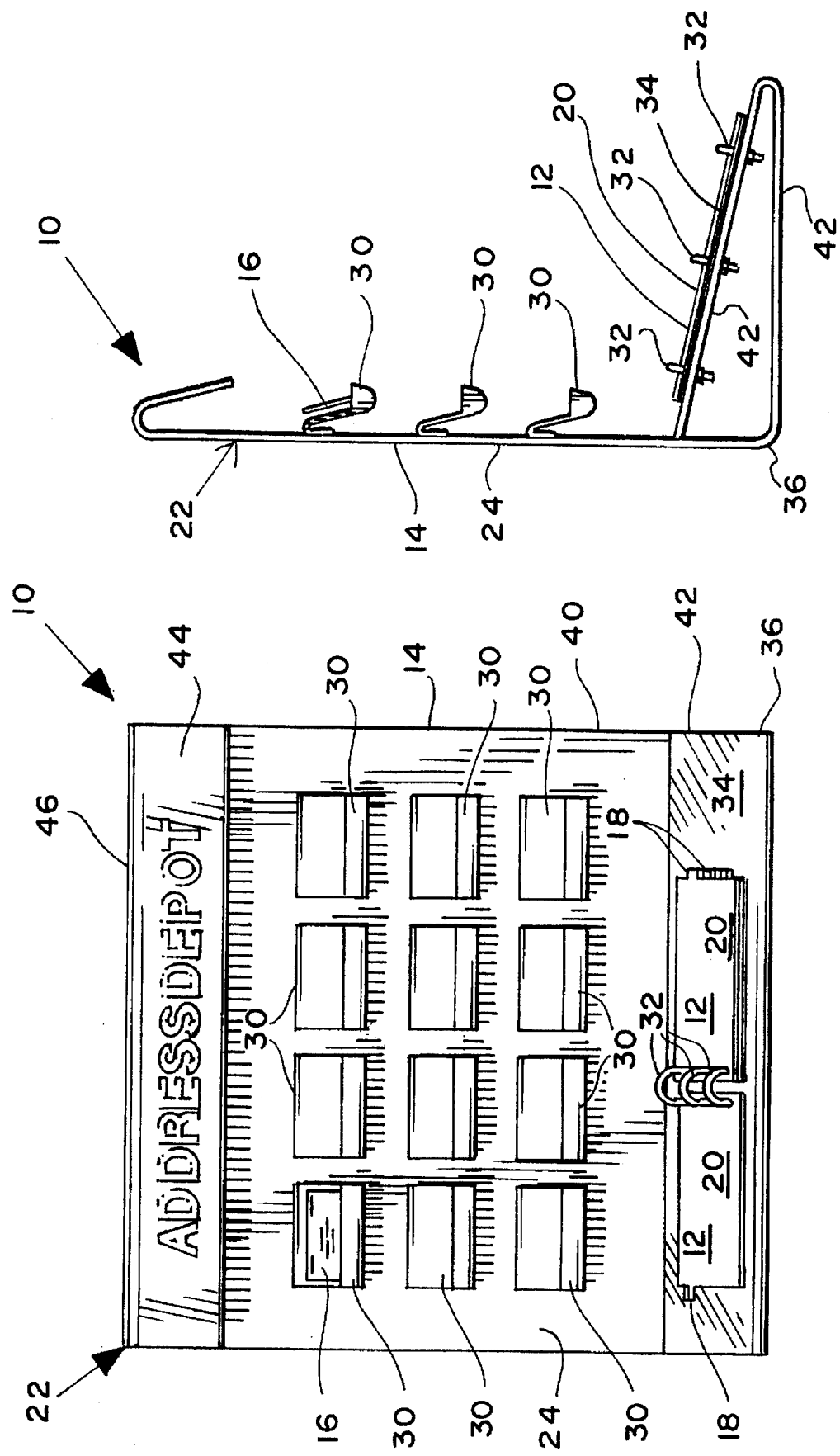

INFORMATION INDEXING METHOD AND APPARATUS

BACKGROUND OF THE INVENTION

1. Field of the Invention

The present invention relates generally to the field of information storage and retrieval. More specifically it relates to a method and apparatus for accessing and retaining information, such as about advertisers. The apparatus includes information storage means and selectively removable indexing means. The information storage means preferably includes a book or a computer in which information is stored by category, such as by advertiser name. The indexing means preferably includes a display structure including an upright panel member having rows of protruding pocket elements into which display members such as business cards are placed. The number of pocket elements is preferably restricted to perhaps one dozen to permit ease of scanning by the observer without being overwhelmed. The display members are marked with an information category corresponding to a category in the storage means. The display structure preferably includes a shelf portion extending forwardly from the base of the upright panel member. The information storage means is mounted on this shelf portion, and the shelf portion may be angled downward for clearer visibility. The method of use includes the steps of scanning the display members in the display structure for a category of interest, accessing the category within the information storage means, and removing the display member to carry away for future reference and reminding.

2. Description of the Prior Art

There have long been indexes in books to direct the reader to a chapter or to a page containing specific information. A problem with these indexes has been that, in certain situations, the reader cannot take the book with him or her for further reflection and reference. There have also been computers which can retrieve information from menus, document lists and window displays. Yet, once again, the observer cannot always conveniently take any of this information with them, except for what the observer happens to remember. One might photocopy or print out data, but this depends upon the presence of some bulky and expensive equipment and some know-how. One might copy data onto a slip of paper, but this is not always convenient and requires access to a writing instrument. None of these prior methods and devices is well suited to advertising with carry-away business cards and supplying optional additional business information with the cards.

There have been various business card display devices. One common such device is the set of transparent plastic sleeves in many wallets. Another is the baseball card display album, having transparent plastic sheets with pockets for individual cards. Cards can be fanned through and removed if necessary upon opening of the wallet or album. Yet these types of devices are not suited to public display for advertising purposes, partly because only a small fraction of the cards can be seen at once. Furthermore, cards alone provide no information about the advertiser beyond the minimal name and address, and possibly a short slogan.

A display card hanger has been provided for displaying jewelry affixed to the cards, as revealed in Joyce, U.S. Pat. No. 4,391,375, issued on Jul. 5, 1983. Some rectangular cardboard cards are provided having an outwardly biased flap hingedly attached to the top edge of the card, which extends rearwardly and downwardly. An elongated plastic hanger for supporting the cards is provided and includes a pair of outwardly extending horizontal ribs and an L-shaped member which extends outwardly above and downwardly in front of the ribs. The display card is receivable between the vertical portion of the L-shaped member and the ribs, and the free edge of the card flap engages the top of the lower rib, providing vertical support for the card. The card can be pulled out of the hanger and replaced. A problem with Joyce is that no information is stored on the card and no additional detailed information is provided relating to the card.

Another prior device is one marketed by a company called CONDO CARDS, INC.™, which is a vertical display panel D having numerous rows of transparent card pockets P across its face. See Prior Art FIG. 1. A clock or other attention drawing device is secured to the face of the panel D near the cards. Several dozen cards are displayed simultaneously on a single panel D, which may be hung near a cash register in a delicatessen. A problem with the CONDO CARDS, INC.™ display is that, while the clock may provide information about the time of day, the display provides no information about the advertisers beyond what is on the cards themselves. Thus the potential customer may lack sufficient reason, based on the information supplied, to decide to contact the card issuer. This is particularly so where the cards are provided by wholesale suppliers and directed to business owners and representatives. A card saying "Jim's pizzas are good", and showing a pizza on the card, may have some very marginal appeal. Yet a card saying "General Gearing makes good gears" may not be sufficient to hold the interest of a representative of a company buying gears. More information is needed. Another problem with the CONDO CARDS, INC.™ apparatus is that there are generally so many card pockets P that the observer is overwhelmed and possibly put off by the shear number of cards to examine. By the time the observer reads all of the cards, should he or she be so patient, the first dozen are probably forgotten.

It is thus an object of the present invention to provide an information access and indexing apparatus and method which permit the observer to view information categories on an index panel with a rapid glance.

It is another object of the present invention to provide such an apparatus and method which permit the observer to remove from the index a display member such as a card having a category and possibly some very brief related information marked on it which may be retained by the observer for future reference.

It is still another object of the present invention to provide such an apparatus which displays a limited number of display members so that the observer is not overwhelmed.

It is finally an object of the present invention to provide such an apparatus which is simple in design and inexpensive to manufacture.

SUMMARY OF THE INVENTION

The present invention accomplishes the above-stated objectives, as well as others, as may be determined by a fair reading and interpretation of the entire specification.

An apparatus for delivering categorized information, including a information storage device designed to retain detailed information divided into categories, including a mechanism for accessing the information by category, and a information indexing assembly including a display structure having several display members and having holding structures for the display members connected to the display structure so that the display members are simultaneously displayed. Each display member has a display face with one of the information categories marked on the display face. At least one of the display members functions to direct an observer to one given information category within the information storage device and functions to remain in the possession of an observer as a reminder of the given information category and of the information retrieved about the given information category. The display member is preferably a business card. The display structure preferably includes an upright panel member having a forward panel member face and the holding structures include several display member retaining pockets formed of transparent material, the pockets being secured to the panel member forward face. The display structure preferably additionally includes a shelf member affixed to and extending forward of the panel member, and the information storage device is positioned on the shelf member. The information storage device may be a book having pages with information marked on the pages, the pages being grouped by the categories of information. At least one of the pages may include a tab marked to identify one of the categories. The information storage device may alternatively be a computer within which the information is stored and is accessible by the categories, the computer having controls with which an observer may retrieve the information by category.

A method of accessing stored information the above described apparatus is also provided, including the steps of observing the display members in the display member holding structures to select a category of interest, accessing the selected category within the information storage device, and removing the selected display member from the display structure for future reference and reminding of the selected category.

BRIEF DESCRIPTION OF THE DRAWINGS

Various other objects, advantages, and features of the invention will become apparent to those skilled in the art from the following discussion taken in conjunction with the following drawings, in which:

Prior art

FIG. 3 is a front view of the apparatus of FIG. 2.

FIG. 4 is a side view of the apparatus of FIG. 3.

DETAILED DESCRIPTION OF THE PREFERRED EMBODIMENTS

Figure 1:
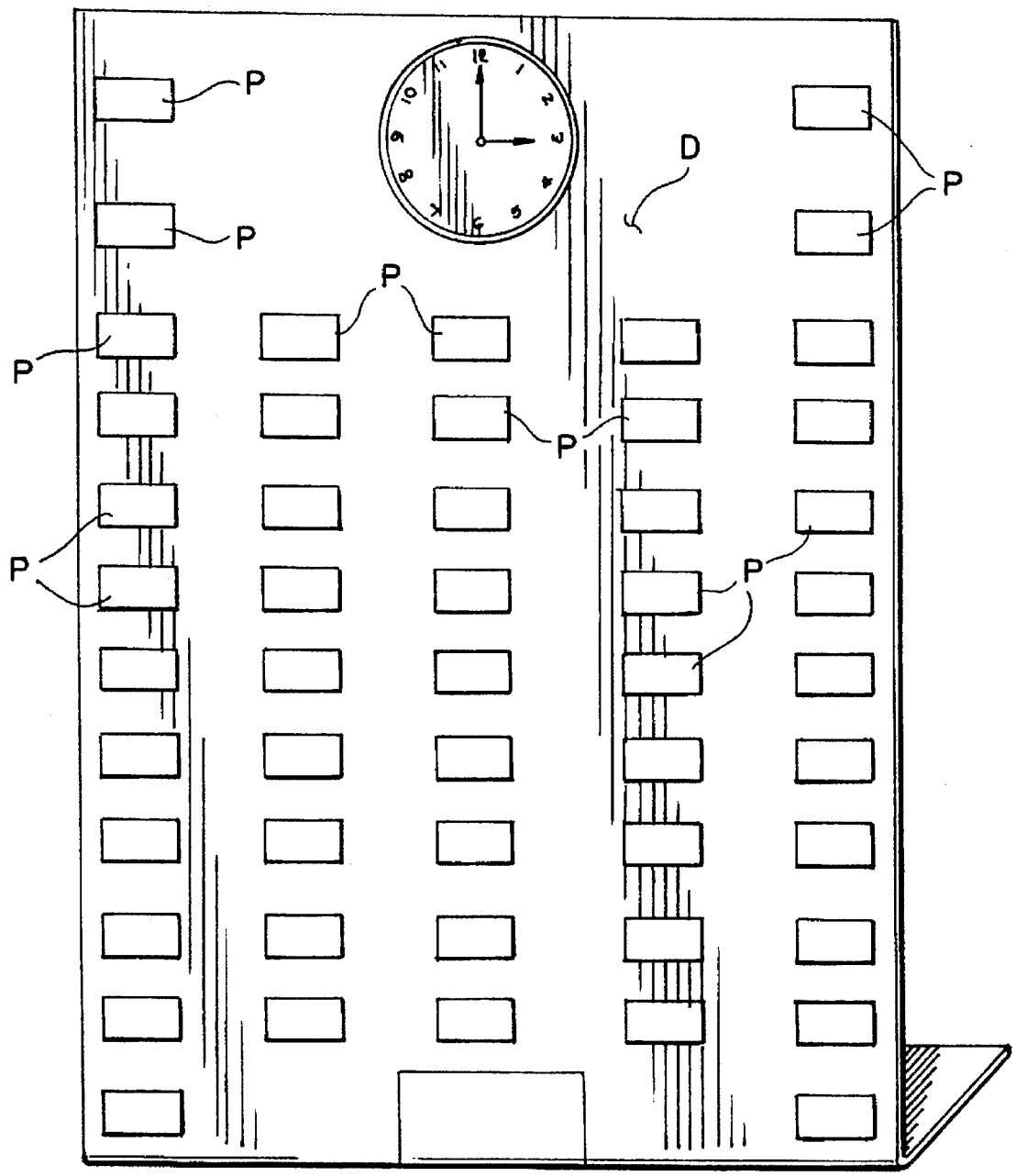
FIG. 1 is a front perspective view of the prior art business card display D with card retaining pockets D offered by CONDO CARDS, INC.™.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
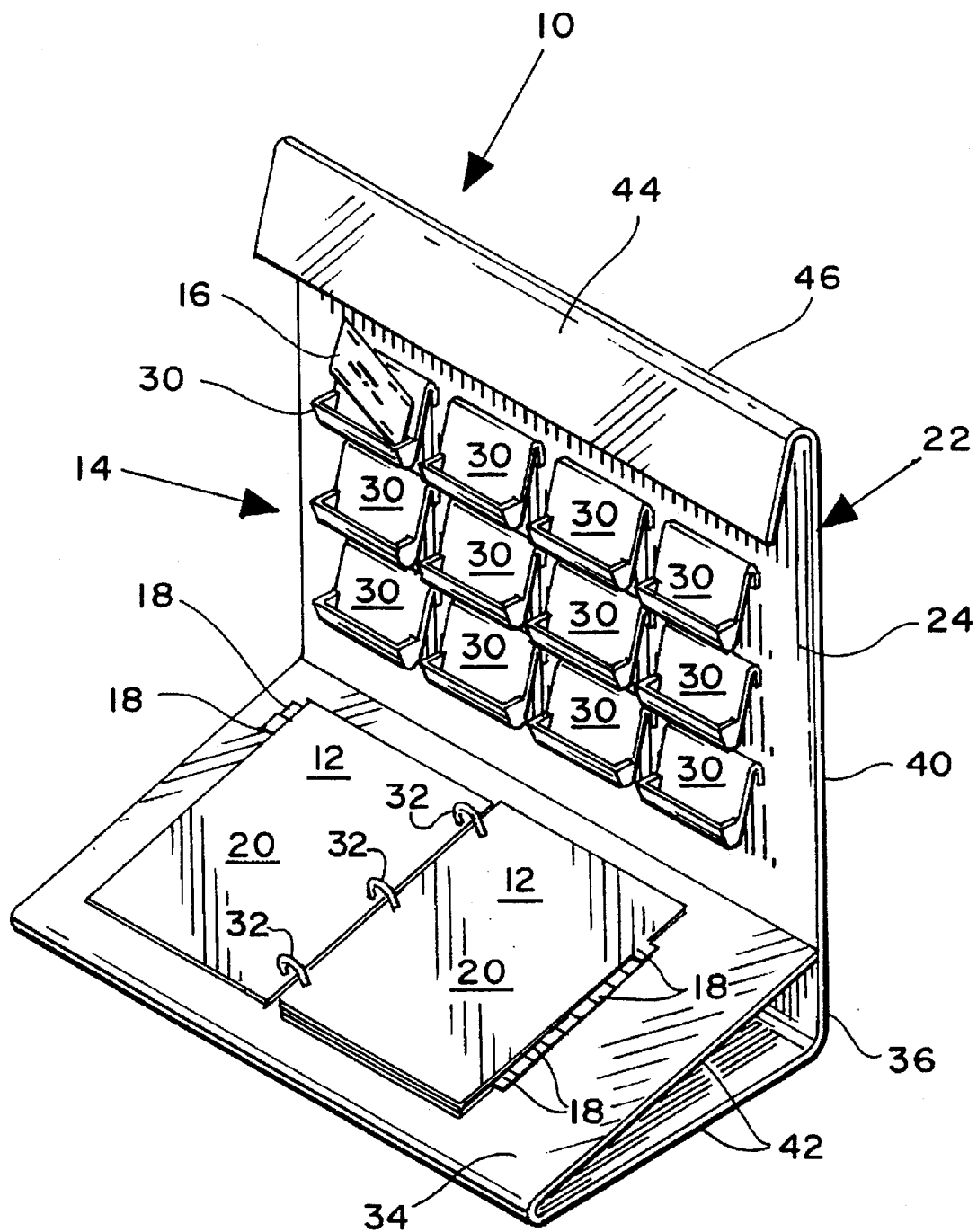
FIG. 2 is a perspective view of the inventive information indexing apparatus, with a book functioning as the information storage means.
Figure 5:
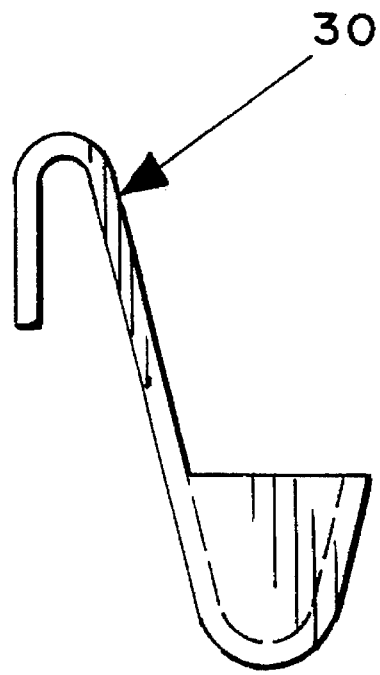
FIG. 5 is a side view of one of the pocket elements.
Figure 6:
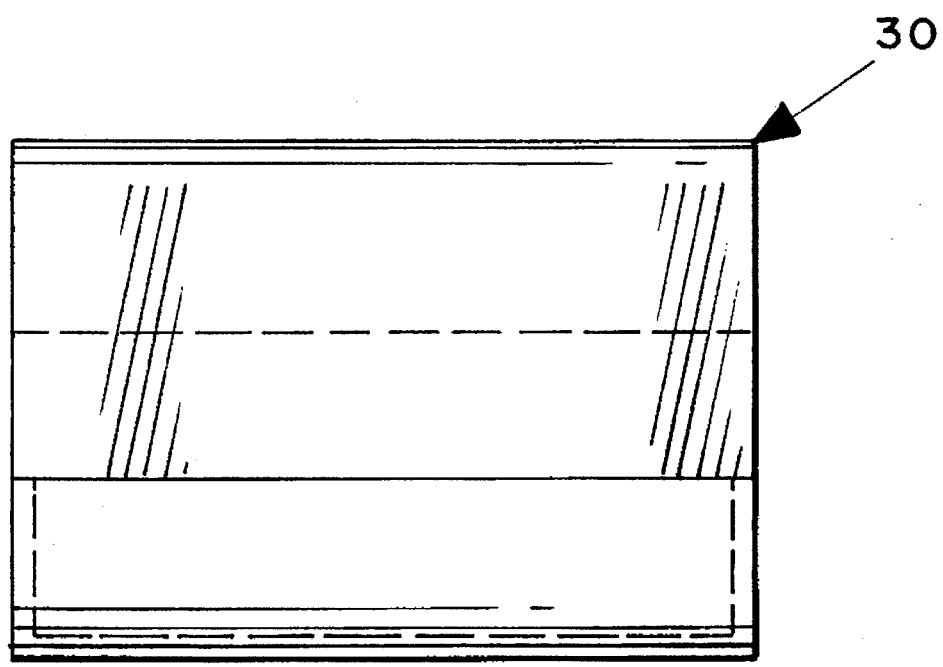
FIG. 6 is a front view of the pocket element of FIG. 5.
Figure 7:
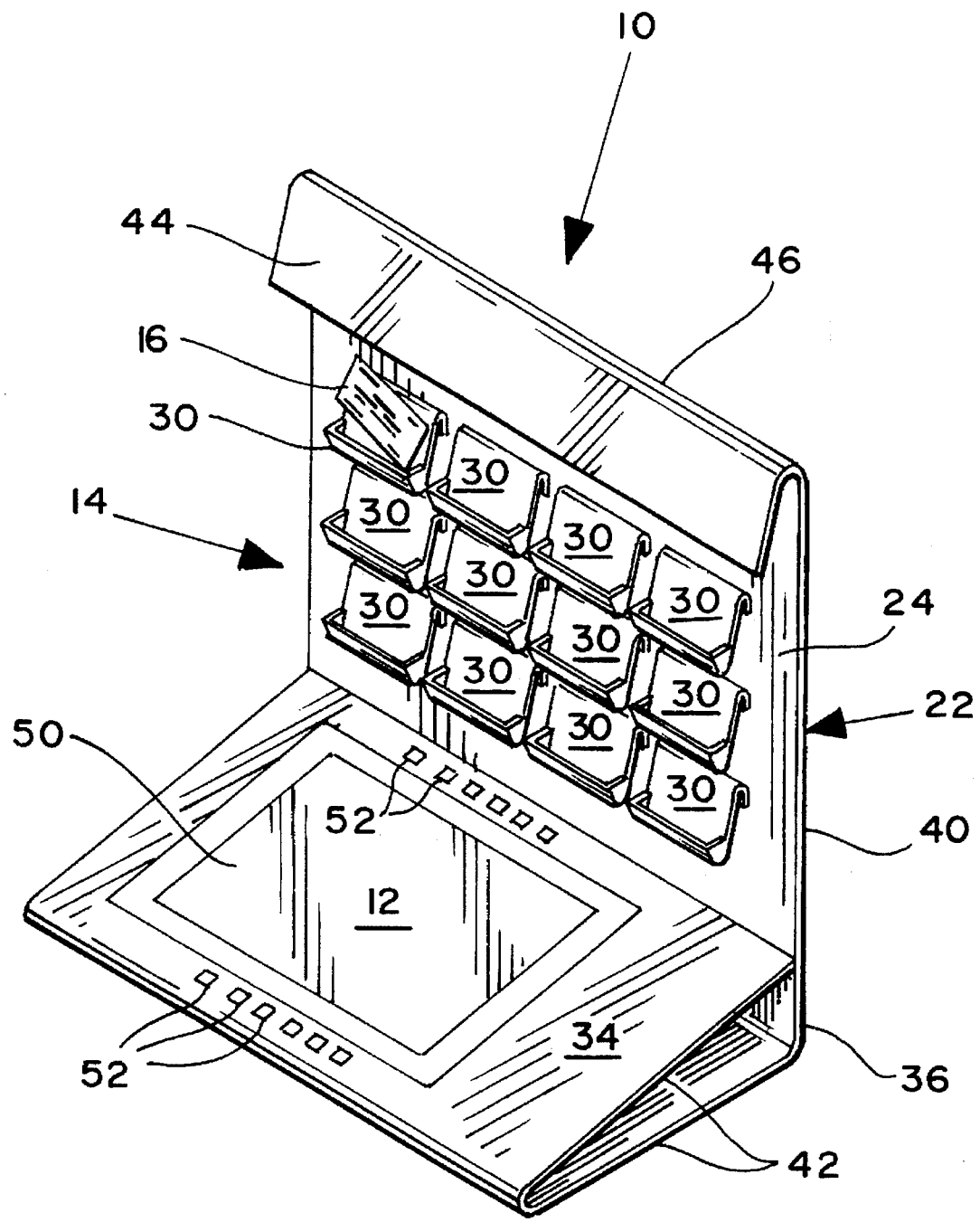
FIG. 7 is a view as in FIG. 2, except that a computer is shown substituted for the book.

Referring to FIGS. 2-7, an apparatus 10 is disclosed for delivering information to observers. Apparatus 10 includes information storage means 12 and indexing means 14 including selectively removable marked display members 16.

Information storage means 12 preferably includes a book 20 in which advertising information is stored by category, such as by advertiser name. Marked tabs 18 may be provided on various pages in book 20 to help the observer find a desired category. Indexing means 14 preferably includes a display structure 22 including an upright panel member 24 having rows of protruding display member holding pocket elements 30. Pocket elements 30 are preferably made of transparent material such as a suitable plastic. The display members 16 placed in pocket elements 30 are preferably conventional business cards, which are each marked with an information category corresponding to a category in information storage means 12. Several duplicate display members 16 are preferably provided within each pocket element 30, so that a sequence of observers may draw one for the same category.

Display structure 22 preferably includes a shelf portion 34 extending forwardly from the lower end 36 of upright panel member 24. Shelf portion 34 is preferably angled downward for clearer visibility and easier access, and notebook ring binders 32 are secured to shelf portion 34 to receive the pages constituting book 20. Information storage means 12 is mounted on shelf portion 34.

Panel member 24 and shelf portion 34 may both be formed from a single sheet 40 of plastic. The sheet 40 is bent at its lower end 36 into an angled loop 42. See FIG. 3. This configuration permits display structure 22 to rest upright on a table top or other substantially horizontal surface. The upper end 46 of sheet 40 may be doubled over in a forward direction to form an overhang 44 for a stylized appearance and to provide a logo or name mounting surface.

The number of pocket elements 30 provided on a single display panel member 24 is preferably restricted to perhaps one dozen or so to permit ease of scanning by the observer without being overwhelmed. This preferred number is not necessary to the essential function of the invention, however, and should not be construed as limiting.

Information storage means 12 may alternatively include a computer 50 such as a CRT, having buttons 52 around its perimeter for an observer to operate. See FIG. 7. The observer operates the buttons 52 to select a category and retrieve related, detailed information about the category, such as about the advertiser and his products or services.

Method

In practicing the invention, the following method may be used. The method of use includes the steps of scanning the display members 16 in the display structure 22 for a category of interest. The observer accesses the category within the information storage means 12 corresponding to the category marked on the display member 16, which might be the name of an advertiser. The observer removes the display member 16 from the display structure 22 pocket element 30 and carries the display member 16 away with him or her for future reference and reminding of the category.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for delivering categorized information to a human viewer, comprising:

information storage means adapted to retain detailed information divided into at least four information categories, including means for accessing said information by category, said information storage means being substantially self-contained, information indexing means being substantially separate from said information storage means and including a display structure having a plurality of display members and having a plurality of display member holding means, such that one of said display member holding means correspond to one of said information categories, each of said display member holding means being sized for retaining at least two display members which are of a duplicate information category at one time and in such a manner that said display members are individually removable by the viewer for future reference, Said display members being retained by said display structure such that the display members corresponding to each of said at least four information categories are simultaneously displayed, each of said display members having a display face with one of said information categories marked on said display face, such that at least four of said display members each individually functions to direct the viewer to a corresponding said information category within said information storage means and functions to remain in the possession of the viewer as a reminder of the given information category and of the information retrieved about said given information category.

2. The apparatus of claim 1, wherein said display member is a business card.

3. The apparatus of claim 1, wherein said display structure comprises an upright panel member having a forward panel member face and said holding means comprises a plurality of display member retaining pockets formed of transparent material, said pockets being secured to said panel member forward face.

4. The apparatus of claim 3, wherein said display structure additionally comprises a shelf member affixed to and extending forward of said panel member, and wherein said information storage means is positioned on said shelf member.

5. The apparatus of claim 1, wherein said information storage means comprises a book having pages with information marked on said pages, said pages being grouped by said categories of information.

6. The apparatus of claim 5, wherein at least one of said pages includes a tab marked to identify one said category.

7. The apparatus of claim 1, wherein said information storage means comprises a computer within which said information is stored and is accessible by said categories, said computer having control means with which the viewer may retrieve said information by category.

8. A method of accessing stored information in an apparatus for delivering categorized information to a human viewer, comprising information storage means adapted to retain detailed information divided into at least four information categories, including means for accessing said information by category, said information storage means being substantially self-contained, information indexing means being substantially separate from said information storage means and including a display structure having a plurality of display members and having a plurality of display member holding means, such that one of said display member holding means correspond to one of said information categories, each of said display member holding means being sized for retaining at least two display members which are of a duplicate information category at one time and in such a manner that said display members are individually removable by the viewer for future reference, said display members being retained by said display structure such that the display members corresponding to each of said at least four information categories are simultaneously displayed, each of said display members having a display face with one of said information categories marked on said display face, such that at least four of said display members each individually functions to direct the viewer to a corresponding said information category within said information storage means and functions to remain in the possession of the viewer as a reminder of the given information category and of the information retrieved about said given information category, comprising the steps of:

observing all categories of said display members in said display member holding means, selecting a display member category, accessing the selected said category within said information storage means to gather information about the selected said category, removing the selected said display member from said display structure for future reference and reminding of the selected said category.

* * * * *